United States Patent

Kushida et al.

[11] Patent Number: 5,233,872
[45] Date of Patent: * Aug. 10, 1993

[54] ACCELERATION SENSOR AND ACCELERATION SENSING SYSTEM

[75] Inventors: Takeo Kushida, Higashimatsuyama; Tomotaka Kurozu, Atugi; Issei Ohmura; Mikio Takeuchi, both of Zama, all of Japan

[73] Assignees: Zexel Corporation, Tokyo; Nissan Motor Company, Ltd., Yokohama, both of Japan

[ * ] Notice: The portion of the term of this patent subsequent to Aug. 20, 2008 has been disclaimed.

[21] Appl. No.: 568,050

[22] Filed: Aug. 16, 1990

[30] Foreign Application Priority Data

Aug. 28, 1989 [JP] Japan .................. 1-220967

[51] Int. Cl.⁵ .............................. G01P 15/11
[52] U.S. Cl. ..................... 73/497; 73/517 R
[58] Field of Search .............. 73/497, 516 R, 517 R, 73/517 B, 654

[56] References Cited

U.S. PATENT DOCUMENTS

| | | | |
|---|---|---|---|
| 4,700,973 | 10/1987 | Gademann et al. | 73/516 R |
| 4,843,877 | 7/1989 | Kushida et al. | 73/517 R |
| 4,887,467 | 12/1989 | Sakuma et al. | 73/517 B |
| 5,024,087 | 6/1991 | Nagasaki et al. | 73/516 R |
| 5,040,418 | 8/1991 | Kushida et al. | 73/516 R |

FOREIGN PATENT DOCUMENTS

| | | |
|---|---|---|
| 3817354 | 12/1988 | Fed. Rep. of Germany . |
| 62-49740 | 3/1987 | Japan . |
| 62-213280 | 9/1987 | Japan . |
| 63-181917 | 11/1988 | Japan . |
| 63-187058 | 11/1988 | Japan . |
| 63-188563 | 12/1988 | Japan . |
| 64-42460 | 3/1989 | Japan . |
| 2191863 | 12/1987 | United Kingdom . |

Primary Examiner—John E. Chapman

[57] ABSTRACT

An acceleration sensor includes a tubular bobbin only one end of which is fixed to a body whereas the other end is movable relative to the body axially of the bobbin. Supported on the body are magnets for attracting a magnetic member, mounted within the bobbin, to a reference position. A detection member is mounted around the bobbin so as to detect a displacement of the magnetic member from the reference position. A gel can be filled in a receiving space of the body in which the bobbin is received. The body can be of a tubular shape, with covers fixedly secured respectively to opposite ends of the body, in which case opposite ends of the bobbin are disposed in opposed, spaced relation to inner sides of the covers, respectively. The body can be received in a housing, and a circuit board can be received in an auxiliary receiving space in the housing. An acceleration sensing system incorporating such a sensor includes a processing circuit for processing an output of the detection member to output a detection signal representative of the direction and magnitude of the acceleration. The processing circuit has a temperature compensation circuit for compensating for a temperature variation so as to keep the detection signal at a constant level when the acceleration is zero.

5 Claims, 5 Drawing Sheets

ACCELERATION SENSOR AND ACCELERATION SENSING SYSTEM

REFERENCE TO RELATED APPLICATIONS

This application is related to application Ser. No. 375,866, filed Jul. 6, 1989, which disclosed a construction similar to that disclosed in this application but in which a bobbin is fixed at only one end thereof to a body. European application No. 89306849.9, which corresponds to Ser. No. 375,866, was published as Publication No. 359367A2.

BACKGROUND OF THE INVENTION

This invention relates to a sensor for sensing acceleration and a sensing system for sensing acceleration.

U.S. Pat. No. 4,843,877 discloses an acceleration sensor which comprises a tubular bobbin, a steel ball (magnetic member) received within the bobbin, a differential transformer (detection means) mounted around the bobbin, and a permanent magnet disposed radially outwardly of the bobbin. The acceleration sensor further comprises a housing, and the bobbin with the differential transformer and the permanent magnet are immovably mounted within the housing, together with a spacer.

In the above conventional acceleration sensor, a reference position of the steel ball (that is, the position of the steel ball when the sensor is subjected to no acceleration) is determined by the permanent magnet. When the sensor is subjected to acceleration, the steel ball is displaced to a position where an inertia force tending to move the steel ball from the reference position is balanced with the force of the permanent magnet tending to bring back the steel ball to the reference position. The displacement of the steel ball from the reference position is detected by the differential transformer, thereby sensing the acceleration.

It is desirable that a differential output of the above differential transformer is zero when acceleration is zero. Therefore, the relative position between the differential transformer and the permanent magnet within the housing is so determined that the position of the steel ball where the differential output of the differential transformer is zero (that is, a magnetic center of the differential transformer in the direction of the axis of the bobbin) coincides with the reference position determined by the permanent magnet.

In the acceleration sensor of the above construction, temperature variations have not been sufficiently taken into consideration. More specifically, since thermal expansion coefficients of the housing, the bobbin and the spacer are different from one another, the relative position between the differential transformer and the permanent magnet is varied, though slightly, so that the magnetic center of the differential transformer is brought out of registry with the reference position. This will now be described with reference to the case where the thermal expansion coefficients of the bobbin and the spacer are higher than that of the housing. In the above acceleration sensor, the housing, the bobbin and the spacer are not fixed relative to one another, and when the temperature drops, a small gap develops between any two of these three parts, thus allowing a small amount of movement of the bobbin (to which the differential transformer attached), as well as a small amount of movement of the permanent magnet. Also, when the temperature rises, the housing limits a thermal expansion of the bobbin, so that the magnetic center of the differential transformer is displaced with respect to the reference position along the direction of the axis of the bobbin.

In addition, since the direction and amount of this displacement are not constant, it is difficult to effect a temperature compensation. Further, in the above acceleration sensor, thermal stresses repeatedly develop between the bobbin and the housing, so that the life time of the bobbin is shortened.

Temperature compensations in different types of acceleration sensors are disclosed in Japanese Laid-Open Patent Application No. 213280/87 and Japanese Laid-Open Utility Model Application Nos. 181917/88, 188563/88 and 42460/89.

With respect to other types of accleration sensors different in type from that of the present invention, Japanese Laid-Open Utility Model Application No. 49740/87 discloses the type of acceleration sensor in which a liquid is filled in a sensor housing, and Japanese Laid-Open Utility Model Application No. 187058/88 discloses the type of acceleration sensor in which a circuit board within a housing is fixed by a potting material.

SUMMARY OF THE INVENTION

It is an object of this invention to provide an acceleration sensor in which a thermal stress is not applied to a bobbin, and a temperature compensation can be effected easily.

Another object of the invention is to provide an acceleration sensing system which can sense acceleration with high precision even when temperature variations occur.

A first aspect of the present invention, is an acceleration sensor which includes a body having a receiving space with a gel material filling it, and a tubular bobbin received in the receiving space. The bobbin is fixed at only one of its opposite ends to the body, and the other end of the bobbin is movable relative to the body in the direction of the axis of the bobbin. A magnetic member is mounted within the bobbin for movement in the direction of the axis of the bobbin. A magnet means for attracting the magnetic member to a reference position within the bobbin is disposed radially outwardly of the bobbin and supported on the body, and a detector or detection means is mounted on an outer periphery of the bobbin so as to detect displacement of the magnetic member from the reference position.

A second aspect of the invention involves an acceleration sensor which includes a tubular body and a pair of covers fixedly secured respectively to opposite ends of the body to define, together with the body, a receiving space. A tubular bobbin is received in the receiving space found in the body, which is fixed at only one of its opposite ends to the body. The other end of the bobbin is movable relative to the body in a direction along the axis of the bobbin, so that opposite ends of the bobbin are disposed in opposed, spaced relation to inner sides of the pair of covers, respectively. A magnetic member is mounted within the bobbin for movement in the direction of the axis of the bobbin, and a magnet means for attracting the magnetic member to a reference position within the bobbin is disposed radially outwardly of the bobbin and supported on the body. A detector or detection means is mounted on an outer periphery of the bobbin so as to detect displacement of the magnetic member from the reference position.

A third aspect of the invention is an acceleration sensor which includes a housing having an internal space and a body having a receiving space, the body being received in the internal space. The portion of the internal space other than that portion of the housing which is occupied by the body serves as an auxiliary receiving space. A tubular bobbin is received in the receiving space of the body and is fixed at only one of its opposing ends to the body. The other end of the bobbin is movable relative to the body along the axis of the bobbin. A magnetic member is mounted within the bobbin for movement in the direction of the axis of the bobbin, and a magnetic means for attracting the magnetic member to a reference position within the bobbin is disposed radially outwardly of the bobbin and supported on the body. A detector or detection means is mounted on an outer periphery of the bobbin so as to detect a displacement of the magnetic member from the reference position, and a circuit board electrically connected to the detection means is received in the auxiliary receiving space of the housing.

A fourth aspect of the invention is an acceleration sensing system which includes a body and a tubular bobbin which is fixed at only one of its opposites ends to the body. The other end of the bobbin is movable relative to the body in the direction of the axis of the bobbin. A magnetic member is mounted within the bobbin for movement in the direction of the axis of the bobbin, and a magnet means for attracting the magnetic member to a reference position within the bobbin is disposed radially outwardly of the bobbin and supported on the body. A detector or detection means is mounted on an outer periphery of the bobbin so as to detect a displacement of the magnetic member from the reference position, and a processing circuit is provided for processing an output of the detection means to produce a detection signal representative of the direction and magnitude of the acceleration. The processing circuit has a temperature compensation circuit for compensating for variation in the output of the detection means due to a variation of the relative position between the magnet means and the detection means in the direction of the axis of the bobbin, so as to keep the detection signal at a constant level when the acceleration is zero, and the variation of the relative position being caused by a temperature variation.

BRIEF DESCRIPTION OF THE DRAWINGS

FIG. 7 is a circuit diagram of an auxiliary circuit for improving rise characteristics when a power source is turned on;

DESCRIPTION OF THE PREFERRED EMBODIMENTS OF THE INVENTION

Figure 1:
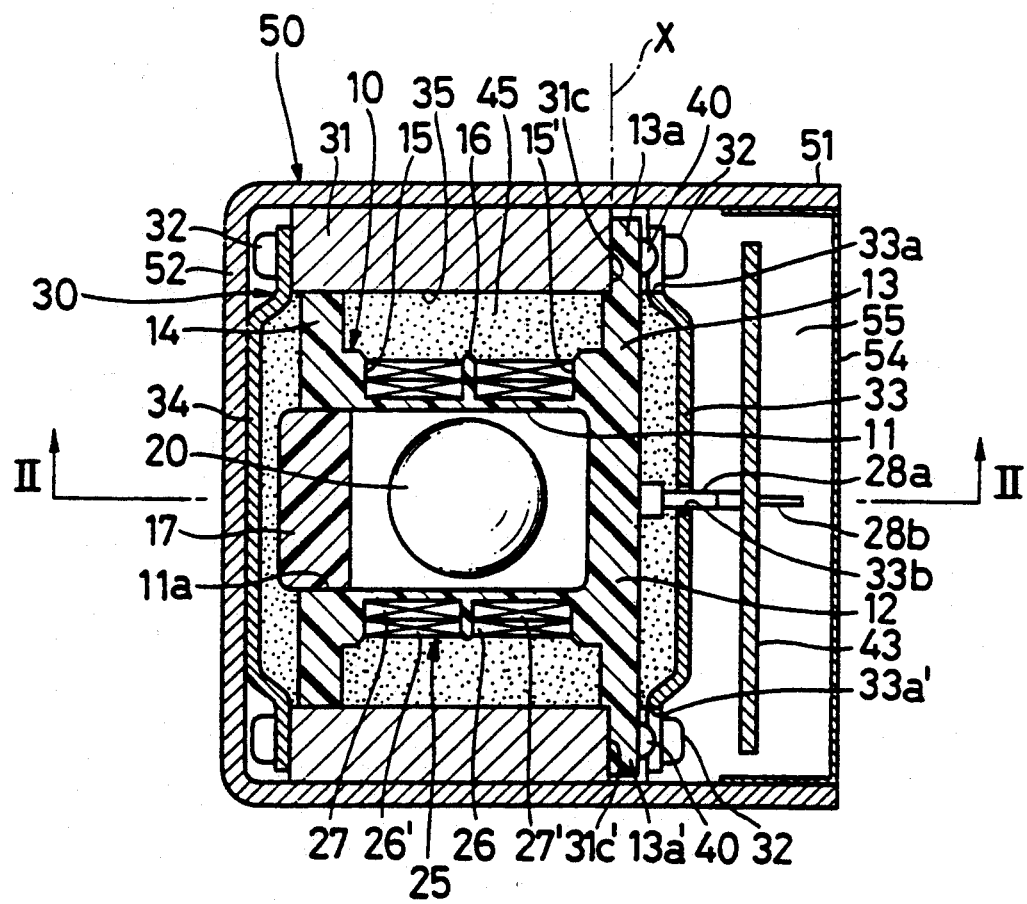
FIG. 1 is a vertical cross-sectional view of an acceleration sensor provided in accordance with the present invention.
Figure 2:
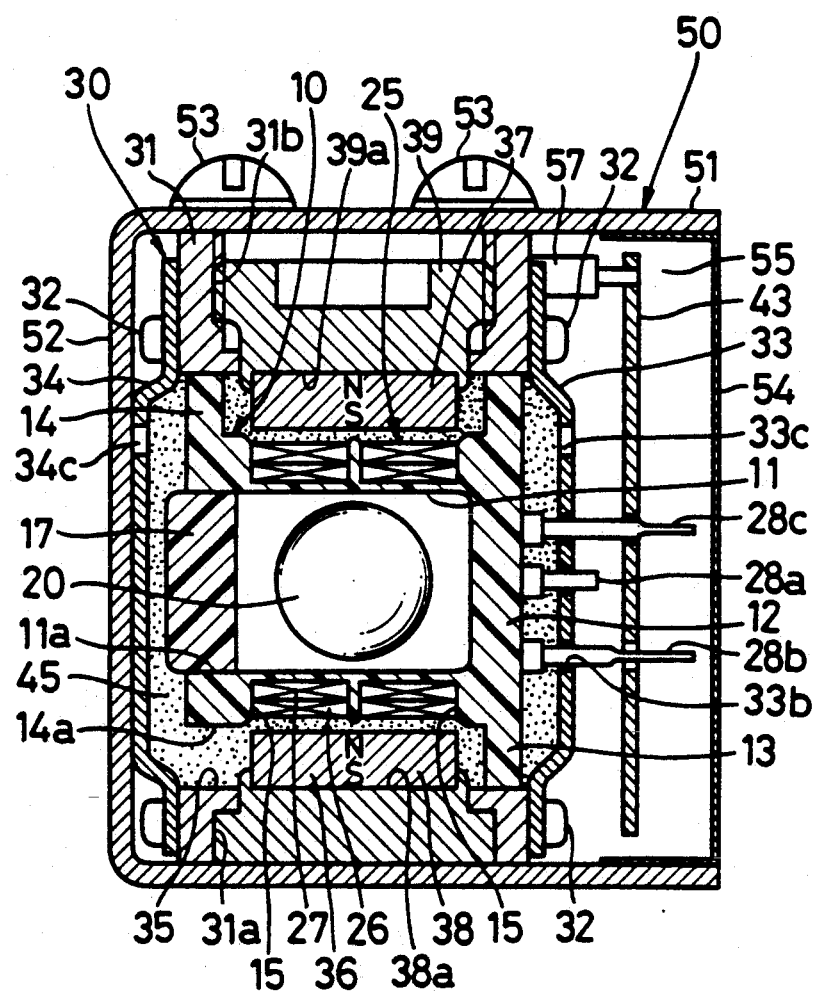
FIG. 2 is a cross-sectional view taken along the line II—II of FIG. 1.

One preferred embodiment of the invention will now be described with reference to the drawings. As shown in FIGS. 1 and 2, an acceleration sensor comprises a tubular bobbin 10 made of a non-magnetic material such as a resin. The bobbin 10 includes a tubular portion 11 of a circular cross-section, an end wall 12 closing one end of the tubular portion 11, and a pair of first and second flanges 13 and 14 of a rectangular shape formed respectively on the opposite ends of the tubular portion 11 and directed radially outwardly. The first flange 13 is continuous with the end wall 12. A pair of annular recesses 15 and 15' are formed in the outer peripheral surface of the tubular, portion 11, and the two annular recesses 15 and 15' are separated from each other by an annular projection 16 disposed therebetween. As shown in FIG. 1, the first flange 13 has a pair of extension portions 13a and 13a' extending away from each other. As shown in FIG. 2, one side of the second flange 14 of a rectangular shape is notched or removed to provide a notched portion 14a.

An open end 11a of the bobbin 10 is closed by a plug or closure member 17 made of a non-magnetic material such as a resin. A steel ball (magnetic member) 20 is received within an internal space defined by the bobbin 10 and the closure member 17, the steel ball 20 being movable in the direction of the axis of the bobbin 10.

A differential transformer (detection means) 25 is mounted around the outer peripheral surface of the bobbin 10. The differential transformer 25 comprises a pair of primary coils 26 and 26', and a pair of secondary coils 27 and 27'. One of the primary coils 26 or 26' and one of the secondary coils 27 or 27' are fixedly received in outer and inner portions of one of the recesses 15, respectively and similarly the other primary coil 26 or 26' and the other secondary coil 27 or 27' are fixedly received in outer and inner portions of the other recess 15, respectively. A magnetic center of the differential transformer 25 in the direction of the axis of the bobbin 10 substantially coincides with the center of the annular projection 16.

Three terminals 28a, 28b and 28c and two other terminals (not shown) are mounted on the end wall 12 of the bobbin 10, all of these terminals extending in the direction of the axis of the bobbin 10. Conductive wires led out respectively from the coils 26 or 26' and 27 or 27' are passed through notches or holes formed in the first flange 13, and are connected respectively to the terminals 28a, 28b and 28c and the above two other terminals. More specifically, one ends of the two secondary coils 27 and 27' are connected together in a differential manner through the terminal 28a, and the other ends of the two secondary coils 27 and 27' are connected to the terminals 28b and 28c, respectively. The two primary coils 26 and 26' are constituted by a single conductive wire, and the opposite ends of this conductive wire are connected to the above two other terminals, respectively.

As described above, the bobbin 10 on which the differential transformer 25 and the terminals 28a, 28b and 28c are mounted is received within a yoke assembly 30 made of a magnetic material.

The yoke assembly 30 serves to constitute a magnetic circuit for permanent magnets 36 and 37 later described. The yoke assembly 30 comprises a tubular body 31 of a rectangular cross-section, and a pair of covers 33 and 34 each fixedly secured to a respective one of the opposite ends of the body 31 by screws 32 at four corners of the end of the body 31. A receiving space 35 is defined by the body 31 and the two covers 33 and 34.

The bobbin 10 is received within the receiving space 35 of the yoke assembly 30 in such a manner that the peripheral surfaces of the flanges 13 and 14 are disposed in slightly spaced, opposed relation to the inner peripheral surface of the body 31. The bobbin 10 is coaxial with the body 31. Here, it is important to note that the bobbin 10 is supported on the body 31 in a cantilever manner, that is, at only one end of the bobbin 10. More specifically, as shown in FIG. 1, a notch 31c is formed in a right end of each of a pair of opposed upper and lower side walls (FIG. 1) of the body 31, and the pair of extension portions 13a and 13a' of the first flange 13 formed on the one end of the bobbin 10 are fitted in the notches 31c and 31c', respectively. The first flange 13 is fixedly secured to the body 31 by screws 40 threaded through each extension portion 13a or 13a' into the body 31. The other end of the bobbin 10, that is, the second flange 14, is not fixed relative to the body 31, and is movable in the direction of the axis of the bobbin 10.

The cover 33 has notches 33a and 33a' receiving the heads of the screws 40, respectively, and also has holes 33b through which the terminals 28a, 28b and 28c and the two other terminals, mounted on the bobbin 10, are loosely passed.

As shown in FIG. 2, the permanent magnets 36 and 37 are supported respectively on the other pair of opposed side walls of the body 31 which do not support the bobbin 10, the bobbin 10 being interposed between the two permanent magnets 36 and 37. More specifically, a stepped hole 31a is formed through one of these two side walls, and a fixing member 38 is fixedly fitted in the stepped hole 31a. The permanent magnet 36 is fixedly fitted in a recess 38a formed in an inner surface of the fixing member 38. A hole 31b having a threaded portion is formed through the other side wall, and an adjusting member 39 is threaded into the hole 31b. The other permanent magnet 37 is fixedly fitted in a recess 39a formed in an inner surface of the adjusting member 39. By adjusting the amount of threading of the adjusting member 39 relative to the hole 31b, the position of the permanent magnet 37 can be adjusted. The permanent magnets 36 and 37 are magnetized radially of the bobbin 10, and the opposed surfaces of the permanent magnets 36 and 37 have opposite magnetic poles, respectively.

A circuit board 43 is fixedly mounted on one end of the body 31 through a plurality of mounting members 42 only one of which is shown in the drawings. Although elements constituting a primary exciting signal-generating circuit 60, a synchronous rectifying-smoothing circuit 70 and an output circuit 80 (see FIG. 3) are attached to the circuit board 43, these elements are not shown in FIGS. 1 and 2. The terminals 28b and 28c extend through the circuit board 43, and are connected to the synchronous rectifying-smoothing circuit 70, and the two other terminals (not shown) are similarly connected to the primary exciting signal-generating circuit 60.

After the bobbin 10 and the covers 33 and 34 are fixed to the body 31, a silicone gel 45 is filled in the receiving space 35 of the yoke assembly 30. The silicone gel 45 is introduced into the receiving space 35, for example, through a hole 34c formed through the cover 34. The silicone gel 45 flows to the cover 33 through the notched portion 14a of the flange 14, a space between the differential transformer 25 and the inner peripheral surface of the body 31 and the above-mentioned notches or holes formed in the flange 13 of the bobbin 10, and fills the receiving space 35. The cover 33 has a hole 33c which serves as an exhaust hole when supplying the silicone gel 45 into the receiving space 35, and also serves as a supply port for supplementarily supplying the silicone gel 45.

The yoke assembly 30, which has the bobbin 10 and the circuit board 43 attached thereto and is filled with the silicone gel 45 as described above, is received within a housing 50. The housing 50 has a tubular portion 51 of a rectangular cross-section, and an end wall 52 closing one end (left end in the drawings) of the tubular portion 51. The yoke assembly 30 is received in an internal space of the housing 50 in such a manner that the yoke assembly 30 is displaced toward the left with the cover 34 held against the end wall 52. The yoke assembly 30 is fixedly secured to the housing 50 by screws 53 threaded through the tubular portion of the housing 50 into the body 31.

That portion of the internal space of the housing 50 which is not occupied by the yoke assembly 30 is used as an auxiliary receiving space 55. The open right end of the tubular portion 51 of the housing 50 is closed by a cover 54. The auxiliary receiving space 55 is defined by the cover 54, the cover 33 of the yoke assembly 30 and the tubular portion 51 of the housing 50. The cover 33 serves as a partition plate separating the receiving space 35 of the yoke assembly 30 from the auxiliary receiving space 55 of the housing 50. The circuit board 43 is received within the auxiliary receiving space 55 of the housing 50.

The yoke assembly 30 is received in the housing 50, and then the right open end of the housing 50 is closed by the cover 54. Thereafter, an epoxy resin (not shown) is filled in the auxiliary receiving space 55 of the housing 50. The epoxy resin is supplied into the auxiliary receiving space 55 through a hole (not shown) formed through the housing cover 54, and is cured or set in the auxiliary receiving space 55. Before filling the epoxy resin, the silicone gel 45 has already been filled in the receiving space 35 of the yoke assembly 30, and therefore the epoxy resin will not intrude into the receiving space 35.

In the acceleration sensor of the above construction, the reference position (i.e., the position when acceleration is zero) of the steel ball 20 is determined by the pair of permanent magnets 36 and 37. The differential transformer 25 is so positioned that when the steel ball 20 is disposed at the reference position at a reference temperature (for example, 20° C.), the differential output is zero. In other words, in this condition, the magnetic center of the differential transformer 25 coincides with the reference position. When the acceleration sensor is in accelerated motion, the steel ball 20 is subjected to the inertia force acting in a direction opposite to the direction of the acceleration, and is moved away from the reference position. At this time, the steel ball 20 is moved or displaced to a position where this inertia force is balanced with the attracting force applied by the permanent magnets 36 and 37 to urge the steel ball 20 toward the reference position. The differential output of the differential transformer 25 has an amplitude corresponding to the magnitude of the acceleration.

When the temperature varies, each component part of the acceleration sensor is thermally expanded or shrunk. Here, it is important to consider the thermal expansion and shrinkage of the bobbin 10 and the body 31 because the differential transformer 25 is mounted on the bobbin 10, and the permanent magnets 36 and 37 are fixedly secured to the body 31, and such thermal expansion and shrinkage change the relative position between the differential transformer 25 and the permanent magnets 36 and 37. This will now be described in detail below.

The one end of the bobbin 10 is fixed to the one end of the body 31 through the first flange 13, and explanation will be made, assuming that the surface of joint between the bobbin 10 (i.e., the flange 13) and the body 31 is a fixed point X (FIG. 1). Since the other end of the bobbin 10 is movable relative to the body 31 in the direction of the axis of the bobbin 10, thermal expansion or thermal shrinkage of the bobbin is not limited or prevented by the body 31. Therefore, the distance between the differential transformer 25 and the fixed point X is changed linearly relative to the temperature variation. On the other hand, the body 31 also thermally expanded and shrunk, and at this time, the distance between the permanent magnets 36 and 37 supported on the body 31 and the fixed point X is also changed substantially linearly relative to the temperature variation.

The bobbin 10 of a resin and the body 31 of a magnetic material are different in thermal expansion coefficient from each other, and because of this difference, the amount of change of the distance between the differential transformer 25 and the fixed point X is different from the amount of change of the distance between the permanent magnets 36 and 37 and the fixed point X. As a result, the relative position between the differential transformer 25 and the permanent magnets 36 and 37 is changed. Due to this change, the magnetic center of the differential transformer 25 is brought out of registry with the reference position. As a result, the output of the differential transformer 25 is not zero when the acceleration is zero, but when the acceleration is of a certain small value, the output of the differential transformer 25 is zero.

However, as described above, the amount of change of the distance between the differential transformer 25 and the fixed point X and the amount of change of the distance between the permanent magnets 36 and 37 and the fixed point X are both in linear relation to the temperature. Therefore, the amount of displacement of the magnetic center of the differential transformer 25 from the reference position is also in linear relation to the temperature, and hence the amplitude of the differential output of the differential transformer 25 when the acceleration is zero is also in linear relation to the temperature. This enables a zero-point temperature compensation later described.

The cantilever fixing of the bobbin 10 to the body 31 provides another advantage that it prevents thermal stresses from being applied to the bobbin 10.

The silicone gel 45 filled in the receiving space 35 of the yoke assembly 30 serves to protect the differential transformer 25 its led-out conductive wires and the connecting portions between the led-out conductive wires and the terminals 28a, 28b and 28c against vibration and moisture. And besides, since Young's modulus of the silicone gel 45 is very low, the silicone gel 45 will not affect the movement of the bobbin 10 relative to the body 31, and thermal expansion and shrinkage of the silicone gel 45 will not deform the bobbin 10 and the body 31. Therefore, the advantages achieved by the cantilever fixing of the bobbin 10 to the body 31 will not be affected.

The cured epoxy resin filled in the auxiliary receiving space 55 of the housing 50 protects the circuit board 43 and the electronic elements mounted thereon against vibration and moisture. Since the circuit board 43 and the connecting portions between the circuit board 43 and the associated electronic elements are liable to be adversely affected by vibration, they are required to be firmly supported. The epoxy resin satisfies this requirement. The rigid epoxy resin is filled only in the auxiliary receiving space 55, and is not filled in the receiving space 35 of the yoke assembly 30. Therefore, the epoxy resin will not prevent thermal expansion and shrinkage of the bobbin 10, and therefore will not affect the advantages of the cantilever fixing of the bobbin 10 to the body 31.

Next, the electric circuitry provided on the circuit board 43 will now be described in detail.

Figure 3:
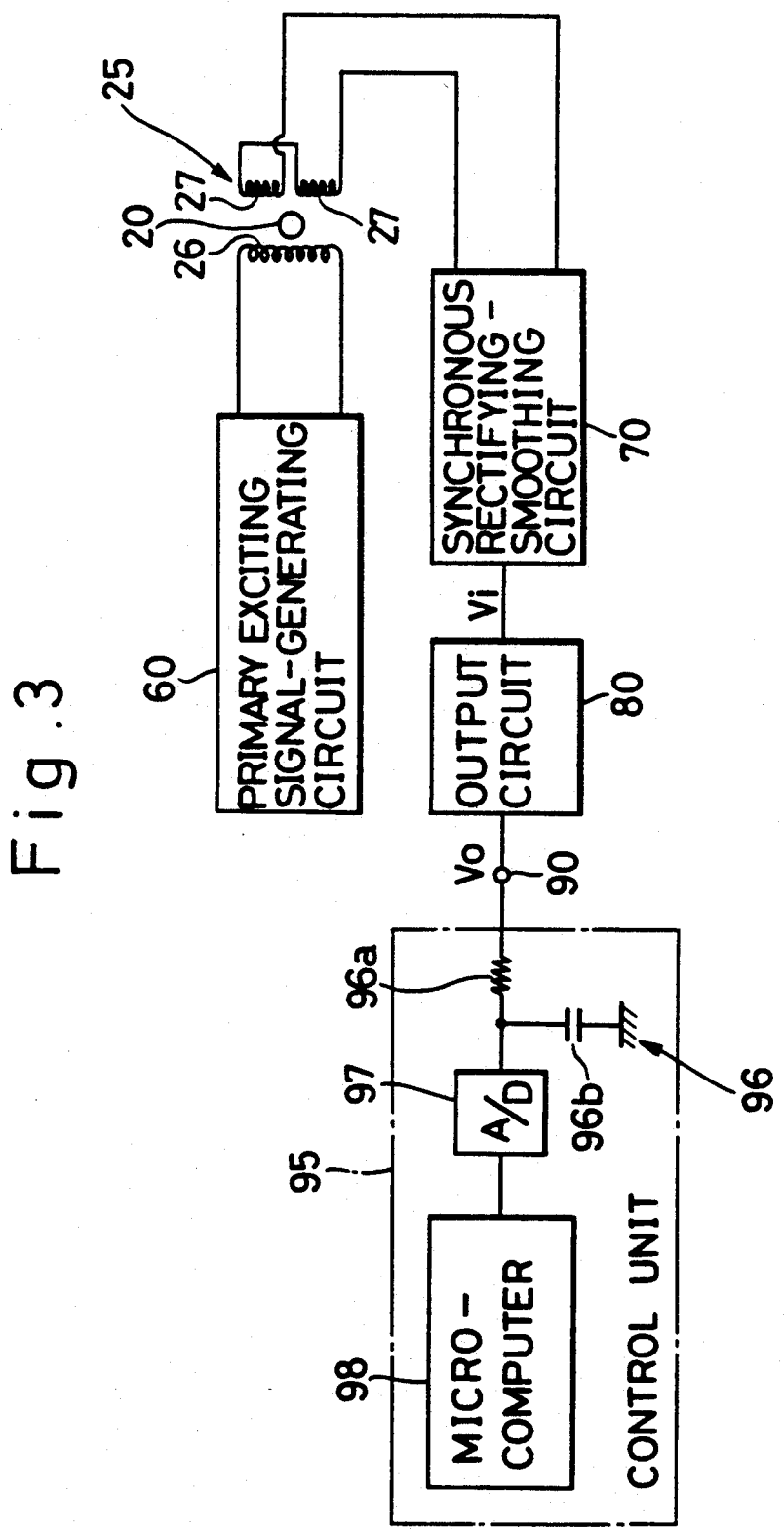
FIG. 3 is a circuit diagram of an electric circuitry connected to a differential transformer of the sensor of FIG. 1.

As shown in FIG. 3, the primary coil 26 of the differential transformer 25 is connected to the primary exciting signal-generating circuit 60 so as to be supplied with a primary signal of a high frequency, so that the differential output of a high frequency is produced at the secondary coils 27 and 27. This differential output is subjected to synchronous rectification and is smoothed by the synchronous rectifying-smoothing circuit 70, so that the differential output is converted into rectified signal Vi having a sign (i.e., positive or negative sign) corresponding to the direction of the acceleration and having a level corresponding to the magnitude of the acceleration. This signal Vi is fed to the output circuit 80 where it is amplified and supplied with a positive detection reference voltage, so that the signal Vi is converted into a detection signal Vo. The detection signal Vo is outputted from an output terminal 90 to a control unit 95. The control unit 95 comprises a low-pass filter 96 composed of a resistor 96a and a capacitor 96b, an analog-to-digital (A/D) converter 97, and a microcomputer 98. Noises of the detection signal Vo are removed by the low-pass filter 96, and the detection signal Vo is converted into a digital signal by the A/D converter 97, and is inputted into the microcomputer 98.

Figure 4:
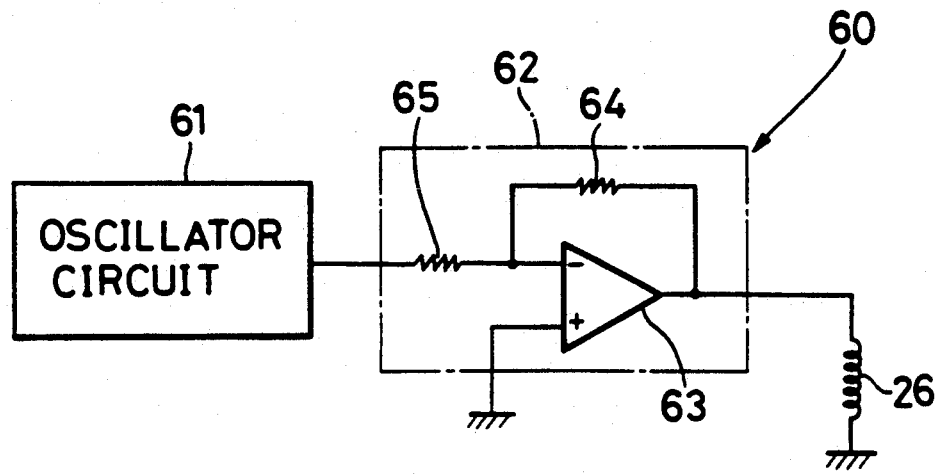
FIG. 4 is a circuit diagram of a primary exciting signal-generating circuit of the electric circuitry of FIG. 3.

As shown in FIG. 4, the primary exciting signal-generating circuit 60 basically comprises an oscillator circuit 61 for generating a high-frequency signal, and an inverting amplifier circuit 62. The inverting amplifier circuit 62 comprises an operational amplifier 63, a negative-feedback resistor 64 connected between an output terminal and an inverting input terminal of the operational amplifier 63, and an input resistor 65 connected between the inverting input terminal of the operational amplifier 63 and the oscillator circuit 61. A non-inverting input terminal of the operational amplifier 63 is grounded.

Figure 5:
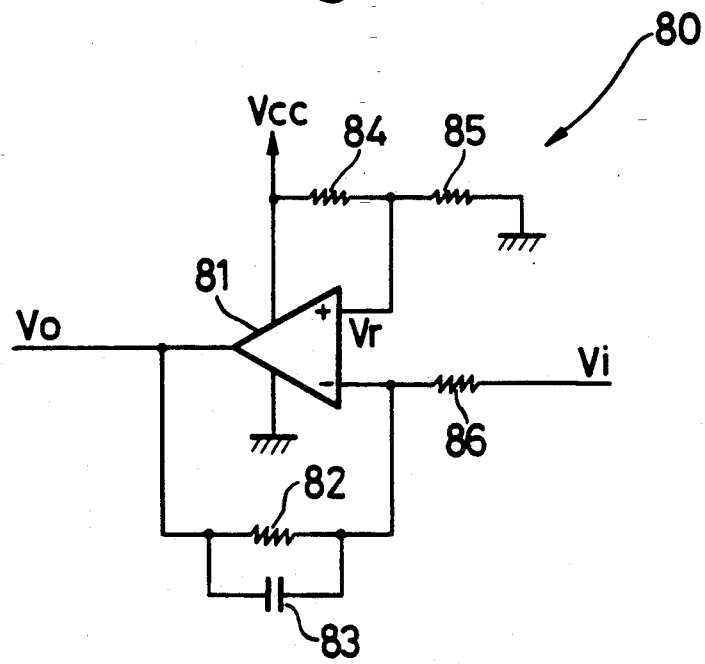
FIG. 5 is a circuit diagram of an output circuit of the electric circuitry of FIG. 3.

As shown in FIG. 5, the output circuit 80 includes an operational amplifier 81. A parallel circuit composed of a negative-feedback resistor 82 and a capacitor 83 is connected between an output terminal and an inverting input terminal of the operational amplifier 81, thereby constituting an inverting amplifier circuit. A reference voltage Vr, obtained by dividing a constant voltage Vcc by resistors 84 and 85, is inputted into a non-inverting input terminal of the operational amplifier 81. The rectified signal Vi from the synchronous rectifying-smoothing circuit 70 is inputted into the inverting input terminal of the operational amplifier 81 via an input resistor 86. The detection signal Vo outputted from the output circuit 80 is expressed by the following formula:

$$Vo = Vr(1 + R_{82}/R_{86}) - Vi(R_{82}/R_{86})$$

where $R_{82}$ and $R_{86}$ are resistivities of the resistors 82 and 86, respectively.

As is clear from the above formula, in the output circuit 80, the rectified signal Vi from the synchronous rectifying-smoothing circuit 70 is inverted and amplified, and also the positive detection reference voltage $Vm = Vr(1 + R_{82}/R_{86})$ is added to the thus inverted and amplified signal Vi, thereby producing the detection signal Vo. The detection signal Vo may be also expressed by the following formula:

$$Vo = VR + (Vr - Vi)R_{82}R_{86}$$

The above formula provides that in the output circuit 80, the voltage difference (Vr−Vi) is amplified, and the positive reference voltage Vr is added to the thus amplified voltage difference, thereby producing the detection signal Vo.

The temperature compensation function of the above-mentioned electric circuitry will now be described.

Reference is first made to the temperature compensation in the primary exciting signal-generating circuit 60. The temperature compensation here is not related to the cantilever fixing of the bobbin 10 to the body 31. When the temperature rises, the amplitude of the high-frequency signal from the oscillator circuit 60 is decreased, and at the same time the resistance of the winding (coil) of the differential transformer 25 is increased. These are factors in the decrease of the amplitude of the different output. On the other hand, when the temperature rises, the magnetic force of the permanent magnets 36 and 37 is weakened, and the position of the steel ball 20 where the inertia force is balanced with the magnetic force is remoter from the reference position. This is a factor in the increase of the amplitude of the differential output. In the case where at the time of the temperature rise, as a result of the combination of the above factors, the amplitude of the differential output decreases, the temperature compensation is effected by using a thermistor as the input resistor 65. More specifically, since the resistance of the input resistor 65 of the thermistor decreases as the temperature increases, the amplification degree (factor) $R_{64}/R_{65}$ of the inverting amplifier circuit 62 increases with the increase of the temperature ($R_{64}$ and $R_{65}$ represent resistivities of the resistors 64 and 65, respectively). As a result, the amplitude of the primary exciting signal applied to the primary coil 26 of the differential transformer 25 is increased, and with this increase, the amplitude of the differential output increases. In the case where as a result of the combination of the above factors, the amplitude of the differential output increases with the temperature increase, thermistor is used as the negative-feedback resistor 64.

Next, the temperature compensation in the output circuit 80 will now be described. The temperature compensation here is related to the cantilever fixing of the bobbin 10 to the body 31. As described above, when the magnetic center of the differential transformer 25 is displaced from the reference position in accordance with the temperature variation, the amplitude of the differential output, produced in the differential transformer 25 when the acceleration is zero, is not zero. Therefore, assuming that the detection reference voltage Vm does not vary with the temperature variation and is kept constant, the detection signal Vo does not coincide with the detection reference voltage Vm. In the present invention, however, the temperature compensation is effected by changing the detection reference voltage Vm in accordance with the temperature variation, thereby keeping the detection signal Vo at a constant level when the acceleration is zero. In other words, the detection signal Vo is caused to coincide with the detection reference voltage Vm at the reference temperature. This will now be described in detail below.

In the case where at the time of the temperature rise, the detection signal Vo increases when the acceleration is zero, the reference voltage Vr is decreased with the temperature increase (and hence the detection reference voltage Vm is decreased) by using a thermistor as the resistor 85 of the output circuit 80 which serves as a temperature compensation element. As a result, the level of the detection signal Vo can be the same as the level of the detection reference voltage Vm at the reference temperature. In the case where at the time of the temperature rise, the detection signal decreases when the acceleration is zero, a thermistor is used as the resistor 84. As is clear from the foregoing description, the output circuit 80 functions as the zero-point compensation circuit.

Figure 6:
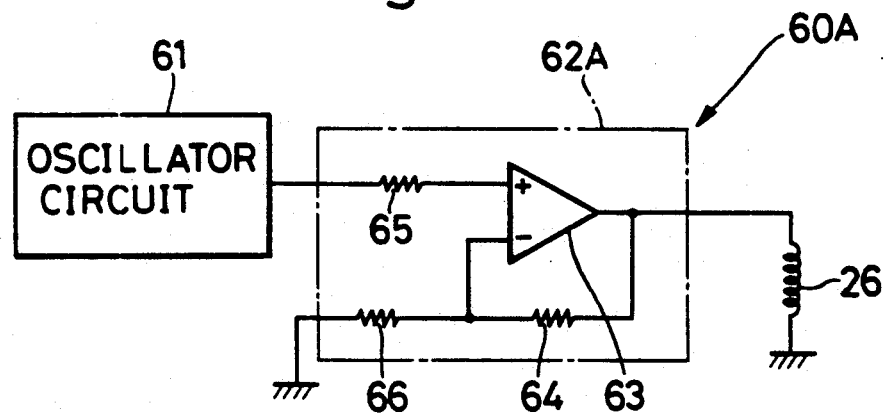
FIG. 6 is a circuit diagram of a modified primary exciting signal-generating circuit.

FIG. 6 shows a modified primary exciting signal-generating circuit 60A. The primary exciting signal-generating circuit 60A employs an non-inverting amplifier circuit 62A. The non-inverting amplifier circuit 62A is identical to the above-mentioned circuit 62 in that an operational amplifier 63 and a negative-feedback resistor 64 are used, but differs therefrom in that a non-inverting input terminal of the operational amplifier 63 is connected to the oscillator circuit 61 via an input resistor 65 and that an inverting input terminal of the operational amplifier 63 is grounded via a grounding resistor 66. In this case, for example, a thermistor is used as the grounding resistor 66 so as to increase the amplification degree (factor), thereby achieving the temperature compensation similar to that of the primary exciting signal-generating circuit 60 of FIG. 4.

Figure 7:
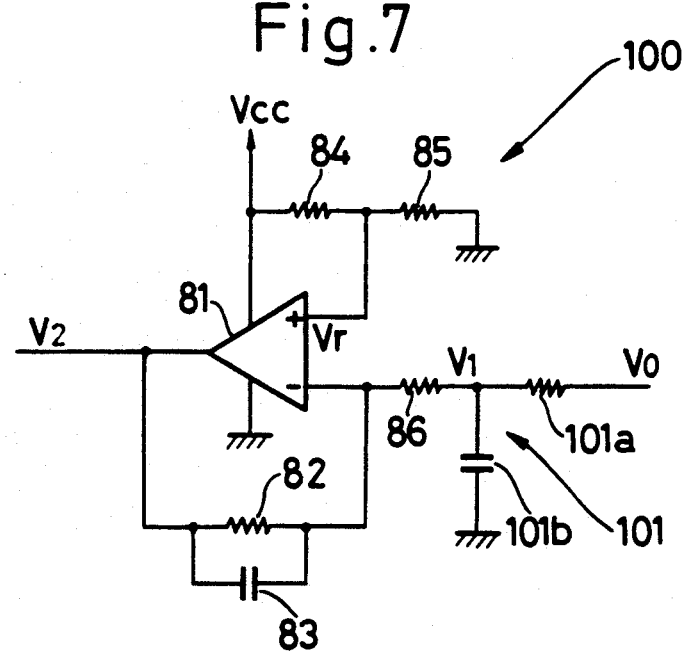
Figure 8:
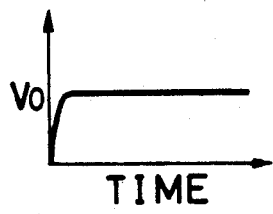
FIGS. 8 to 11 are views respectively showing signal levels at relevant points which signal levels are obtained when incorporating the auxiliary circuit of FIG. 7 into the electric circuitry of FIG. 3.
Figure 9:
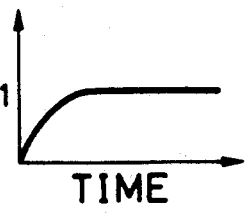
Figure 10:
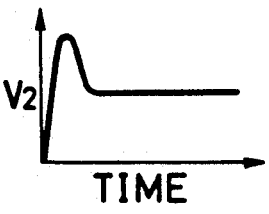
Figure 11:
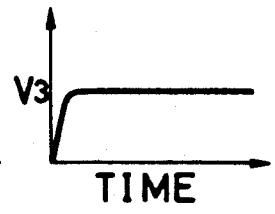

The low-pass filter 96 of the control unit 95 which eliminates noises of the detection signal Vo invites the following disadvantages when the detection operation is started by turning on a power source. As shown in FIG. 8, when the power source is turned on, although the detection signal Vo relatively rapidly rises to a voltage level corresponding to "zero" of the acceleration (i.e., to the detection reference voltage Vm), the rise of the detection signal Vo to the detection reference voltage Vm is inputted into the microcomputer 96 with a time delay because of the low-pass filter 96. It is necessary that the microcomputer 98 input thereinto the signal of a proper voltage level corresponding to "zero" of the acceleration in order to effect the initialization and self-checking of a malfunction. Therefore, in the microcomputer 98, the initialization and the malfunction self-checking must be done upon lapse of the time delay caused by the low-pass filter 96. Thus, these processings are delayed. To overcome this disadvantage, an auxiliary circuit 100 shown in FIG. 7 is connected between the output terminal 90 and the control unit 95 (FIG. 3). The auxiliary circuit 100 is similar to the above-mentioned output circuit 80, and therefore those parts of the former corresponding respectively to those of the latter are designated respectively by identical reference numerals, and detailed description of such corresponding parts will be omitted. The auxiliary circuit 100 differs from the output circuit 80 in that a low-er-pass filter 101 composed of a resistor 101a and a capacitor 101b is connected to an input side of an input resistance 86. With this low-pass filter 101, the rise of the detection signal Vo when turning on the power source is positively delayed so as to obtain a delayed detection signal V1 as shown in FIG. 9. Simultaneously when the power source is turned on, the reference voltage Vr is instantaneously applied to a non-inverting input terminal of an operational amplifier 81, and therefore when the delayed detection signal V1 is inputted to the inverting input terminal, an output signal V2 of the operational amplifier 81 is subjected to an overshoot as shown in FIG. 10. When the output signal V2 with such overshoot is inputted to the low-pass filter 96 of the control unit 95, the overshoot is eliminated due to its delayed rise effect, thereby providing a signal V3 which rises rapidly, the signal V3 being fed to the microcomputer 98 via the A/D converter 97. With this arrangement, the microcomputer 98 can effect the self-checking of a malfunction and the initialization without delay. By using a temperature compensation element as one of resistors 84 and 85, the auxiliary circuit 100 can function as a zero-point compensation circuit for performing the above-mentioned operation. In this case, the output circuit 80 may not have a zero-point compensation function.

The present invention is not restricted to the above embodiments, and various modifications can be made.

What is claimed is:

1. An acceleration sensor comprising:
   (a) a housing having an internal space;
   (b) a body having a receiving space, said body being received in said internal space, and that portion of said internal space other than the portion of said housing occupied by said body serving as an auxiliary receiving space;
   (c) a tubular bobbin received in said receiving space of said body, said tubular bobbin being fixed at only one of its opposite ends to said body, and the other end of said bobbin being movable relative to said body in a direction of the axis of said bobbin;
   (d) a magnetic member received within said bobbin for movement in the direction of the axis of said bobbin;
   (e) magnet means for attracting said magnetic member to a reference position within said bobbin, said magnet means being disposed radially outwardly of said bobbin and supported on said body;
   (f) detection means mounted on an outer periphery of said bobbin so as to detect a displacement of said magnetic member from said reference position; and
   (g) a circuit board electrically connected to said detection means, said circuit board being received in said auxiliary receiving space of said housing;
   wherein said body has a tubular shape, a partition plate being secured to one end of said body, and said partition plate separating said receiving space of said body from said auxiliary receiving space of said housing;
   wherein the bobbin is positioned in such a manner that one end of said bobbin is disposed close to said auxiliary receiving space of the housing whereas the other end of said bobbin is disposed remote from said auxiliary receiving space; and
   wherein a rigid resin is filled in said auxiliary receiving space of said housing, and a gel material is filled in said receiving space of said body.

2. An acceleration sensor comprising:
   (a) a housing having an internal space;
   (b) a body having a receiving space, said body being received in said internal space, and that portion of said internal space other than that portion of said housing occupied by said body serving as an auxiliary receiving space;
   (c) a tubular bobbin received in said receiving space of said body, said tubular bobbin being fixed at only one of its opposite ends to said body, and the other end of said bobbin being movable relative to said body in a direction of the axis of said bobbin;
   (d) a magnetic member received within said bobbin for movement in the direction of the axis of said bobbin;
   (e) magnet means for attracting said magnetic member to a reference position within said bobbin, said magnet means being disposed radially outwardly of said bobbin and supported on said body;
   (f) detection means mounted on an outer periphery of said bobbin so as to detect a displacement of said magnetic member from said reference position; and
   (g) a circuit board electrically connected to said detection means, said circuit board being received in said auxiliary receiving space of said housing;
   wherein said body has a tubular shape, a partition plate being secured to the one end of said body, and said partition plate separating said receiving space of said body from said auxiliary receiving space of said housing;
   wherein the bobbin is positioned in such a manner that one end of said bobbin is disposed close to said auxiliary receiving space of the housing whereas the other end of said bobbin is disposed remote from said auxiliary receiving space;
   wherein said bobbin has an end wall formed at the one end thereof, a plurality of terminals being formed on said end wall and extending through said partition wall toward said auxiliary receiving space of said housing, and said detection means being electrically connected to said circuit board via said terminals; and
   wherein a rigid resin is filled in said auxiliary receiving space of said housing, and a gel material is filled in said receiving space of said body.

3. An acceleration sensor comprising:
   (a) a housing having an internal space;
   (b) a body having a receiving space, said body being received in said internal space, and that portion of said internal space other than that portion of said housing occupied by said body serving as an auxiliary receiving space;
   (c) a tubular bobbin received in said receiving space of said body, said tubular bobbin being fixed at only one of its opposite ends to said body, and the other end of said bobbin being movable relative to said body in a direction of the axis of said bobbin;

(d) a magnetic member received within said bobbin for movement in the direction of the axis of said bobbin;

(e) magnet means for attracting said magnetic member to a reference position within said bobbin, said magnet means being disposed radially outwardly of said bobbin and supported on said body;

(f) detection means mounted on an outer periphery of said bobbin so as to detect a displacement of said magnetic member from said reference position; and (g) a circuit board electrically connected to said detection means, said circuit board being received in said auxiliary receiving space of said housing;

wherein said circuit board has a processing circuit for processing an output of said detection means to produce a detection signal representative of the direction and magnitude of the acceleration, said processing circuit having a temperature compensation circuit for compensating for a variation of the output of said detection means due to a variation of the relative position between said magnet means and said detection means in the direction of the axis of said bobbin, so as to keep said detection signal at a constant level when the acceleration is zero, and said variation of the relative position being caused by a temperature variation; and wherein a rigid resin is filled in said auxiliary receiving space of said housing, and a gel material is filled in said receiving space of said body.

4. An acceleration sensor according to claim 3, in which said detection means comprises a differential transformer having a primary coil and a pair of secondary coils, said processing circuit comprising a primary exciting signal-generating circuit for outputting a primary exiting signal of high frequency to said primary coil of said differential transformer, a synchronous rectifying-smoothing circuit for effecting synchronous rectification and smoothing of a differential output of said second coils, and an output circuit for amplifying a voltage difference between a reference voltage and an output of said synchronous rectifying-smoothing circuit and for adding said reference voltage to the amplified voltage difference, and said output circuit having an element for varying said reference voltage in accordance with a temperature variation, so that said output circuit functions as said temperature compensation circuit.

5. An acceleration sensing system comprising:
(a) a body;
(b) a tubular bobbin which is fixed at only one of its opposites ends to said body, the other end of said bobbin being movable relative to said body in a direction of the axis of said bobbin;
(c) a magnetic member received within said bobbin for movement in the direction of the axis of said bobbin;
(d) magnet means for attracting said magnetic member to a reference position within said bobbin, said magnet means being disposed radially outwardly of said bobbin and supported on said body;
(e) detection means received on an outer periphery of said bobbin so as to detect a displacement of said magnetic member from said reference position; and
(f) a processing circuit for processing an output of said detection means to produce a detection signal representative of the direction and magnitude of the acceleration, said processing circuit having a temperature compensation circuit for compensating for a variation of the output of said detection means due to a variation of the relative position between said magnet means and said detection means in the direction of the axis of said bobbin, so as to keep said detection signal at a constant level when the acceleration is zero, and said variation of the relative position being caused by a temperature variation.

* * * * *